(12) United States Patent
Seo

(10) Patent No.: US 7,057,990 B1
(45) Date of Patent: Jun. 6, 2006

(54) POWER CONTROL OF LASER DIODE IN AN OPTICAL RECORDING/PLAYBACK APPARATUS

(75) Inventor: Jin-gyo Seo, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 09/515,101

(22) Filed: Feb. 29, 2000

(30) Foreign Application Priority Data

May 25, 1999 (KR) .......................... 99-18848

(51) Int. Cl.
*G11B 7/00* (2006.01)

(52) U.S. Cl. .............................. 369/47.52; 369/53.18; 369/53.27; 369/53.34; 369/116

(58) Field of Classification Search .............. 369/53.26, 369/53.27, 47.5, 47.51, 47.52, 53.34, 53.37, 369/116, 53.18, 53.24
See application file for complete search history.

(56) References Cited

U.S. PATENT DOCUMENTS

| | | | | |
|---|---|---|---|---|
| 3,943,446 A | * | 3/1976 | Quidort | 375/238 |
| 4,663,760 A | | 5/1987 | Shimada et al. | 372/31 |
| 4,803,440 A | * | 2/1989 | Hotta et al. | 330/145 |
| 4,856,011 A | | 8/1989 | Shimada et al. | 372/38 |
| 4,858,219 A | * | 8/1989 | Yoshikawa | 369/116 |
| 5,146,240 A | * | 9/1992 | Hayashi et al. | 346/108 |
| 5,157,642 A | * | 10/1992 | Tsukamura et al. | 369/32 |
| 5,414,692 A | * | 5/1995 | Aoki | 369/275.3 |
| 5,528,577 A | * | 6/1996 | Maenza | 369/53.27 |
| 5,675,600 A | * | 10/1997 | Yamamoto et al. | 372/38.01 |
| 5,721,579 A | * | 2/1998 | Ogasawara et al. | 347/246 |
| 5,953,305 A | * | 9/1999 | Jeong | 369/124 |
| 6,081,289 A | * | 6/2000 | Ogasawara et al. | 347/246 |
| 6,222,815 B1 | * | 4/2001 | Nagano | 369/47.51 |
| 6,246,659 B1 | * | 6/2001 | Suzuki et al. | 369/116 |
| 6,285,641 B1 | * | 9/2001 | Dang et al. | 369/53.41 |
| 6,310,854 B1 | * | 10/2001 | Sato et al. | 369/275.3 |
| 6,324,198 B1 | * | 11/2001 | Otsuka | 372/38.07 |
| 6,414,974 B1 | * | 7/2002 | Russell et al. | 372/38.02 |
| 6,469,979 B1 | * | 10/2002 | Joo et al. | 369/275.3 |
| 6,477,131 B1 | * | 11/2002 | Tsuchinaga et al. | 369/124.12 |

FOREIGN PATENT DOCUMENTS

| | | |
|---|---|---|
| EP | 0 713 215 A2 | 5/1996 |
| JP | 11-73667 | 3/1999 |

OTHER PUBLICATIONS

Patent Abstracts of Japan, vol. 1996, Dec. 26, 1996 & JP 08 203084 A, Aug. 9, 1996 *abstract*.

* cited by examiner

*Primary Examiner*—Gautam R. Patel
(74) *Attorney, Agent, or Firm*—Staas & Halsey LLP

(57) ABSTRACT

A method and apparatus for controlling the power of a laser diode, which can prevent fluctuation in the laser power of the laser diode at a record/playback area of an optical disc. The apparatus for controlling the power of the laser diode includes a controller which controls an automatic power control of the laser diode (APC controller), interposed between an up/down counter and a laser diode driver, the APC controller latching the output of the up/down counter in synchronism with a periodic synchronization signal, and outputting the latch result to the laser diode driver. Therefore, the power level of the laser diode can be periodically controlled according to subdivided control modes, so that the laser power level remains resilient to external noise, compared to a continuous control operation through the entire mode.

36 Claims, 4 Drawing Sheets

FIG. 5

POWER CONTROL OF LASER DIODE IN AN OPTICAL RECORDING/PLAYBACK APPARATUS

CROSS-REFERENCE TO RELATED APPLICATIONS

This application claims the benefit of Korean Application No. 99-18848, filed May 25, 1999, in the Korean Patent Office, the disclosure of which is incorporated herein by reference.

BACKGROUND OF THE INVENTION

1. Field of the Invention

The present invention relates to a method and apparatus for controlling power supplied to a laser diode to an optimal level in an optical recording/playback apparatus, and more particularly, to a method and apparatus for controlling the power supplied to the laser diode, so that fluctuation in the power of the laser diode, which occurs at a record/playback area of an optical disc, can be prevented.

2. Description of the Related Art

With the advent of multimedia, the demand for high-density recording media has increased. Such high-capacity recording media include magnetic optical disc drives (MODD), digital versatile disc-read only memory (DVD-ROM) drives, DVD-random access memory (DVD-RAM) drives and the like.

Such optical recording apparatuses must be optimized with high-accuracy depending on the type of optical recording medium used. In order to ensure accurate recording/playback of data, such optical recording apparatuses include an automatic laser diode power control (APC) circuit for controlling the power applied to a laser diode (LD).

Figure 1:
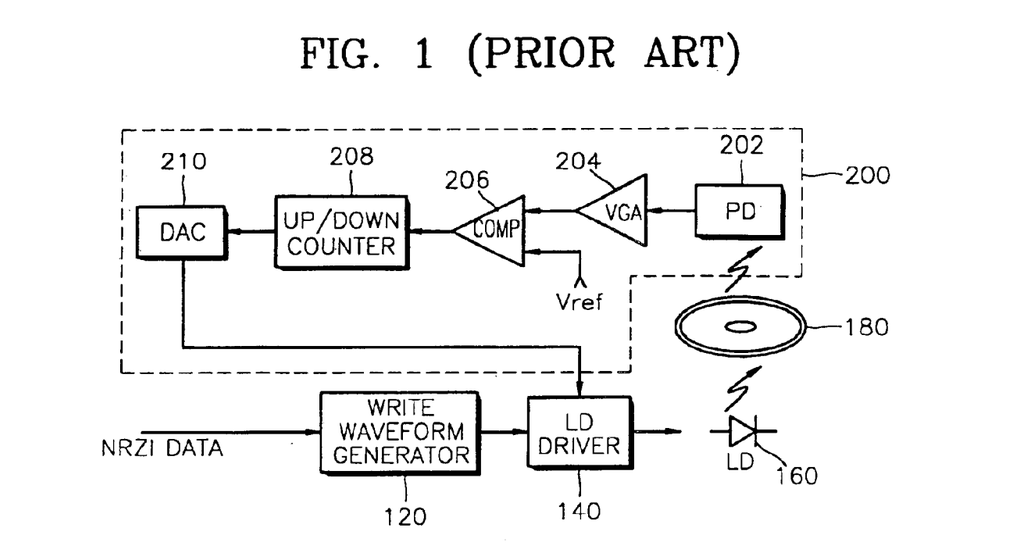
FIG. 1 is a block diagram showing the structure of a conventional automatic laser diode power control (APC) circuit.

FIG. 1 is a block diagram showing the structure of an APC circuit in a conventional optical recording apparatus. In FIG. 1, reference numeral 120 represents a write waveform generator for generating write pulses to form spaces and marks according to data to be recorded, reference numeral 140 represents an LD driver for controlling the power of an LD 160 according to the write pulses generated by the write waveform generator 120. Data to be recorded is input to the write waveform generator 120, in the form of a non return to zero inverted (NRZI) signal. Also, in the case of a DVD-RAM, a combination of a first pulse, a last pulse, a cooling pulse and a multi-pulse train is output.

An APC circuit 200 includes a photo diode (PD) 202, a variable gain amplifier (VGA) 204, a comparator (COMP) 206, an up/down counter 208 and a digital-to-analog converter (DAC) 210. The PD 202 receives laser beams reflected by a disc 180, and generates a current signal corresponding to the amount of the received laser beam. The VGA 204 amplifies the current signal from the PD 202 to a predetermined gain and converts the current signal into a voltage signal. The COMP 206 compares the output from the VGA 204 to a reference voltage Vref, and outputs a binary decision signal indicating which one is higher than the other, according to the comparison result.

The up/down counter 208 performs up or down counting based on the comparison result from the COMP 206. If the decision signal from the COMP 206 represents that the output from the VGA 204 is higher than the reference voltage Vref, for example, if the decision signal is low, the up/down counter 208 performs up-counting. Meanwhile, if the decision signal represents that the output from the VGA 204 is lower than the reference voltage Vref, for example, if the decision signal is high, the up/down counter 208 performs down-counting. The count result from the up/down counter 208 is applied through the DAC 210 to the LD driver 140. The LD driver 140 controls the amount of power supplied to the LD 160 according to the amplitude of the signal applied from the DAC 210.

The APC circuit 200 of FIG. 1 detects the difference between the output level of the LD 160, which is detected by the PD 202, and the reference voltage, and controls the power supplied to LD 160 in accordance with the detected difference. However, in the APC circuit 200 of FIG. 1, the output from the LD 160 continuously changes even at an effective data area of the disc 180 due to a continuous operating characteristic of the up/down counter 208. Thus, it is difficult to obtain an accurate recording/playback result. In addition, the APC 200 is susceptible to external noise.

SUMMARY OF THE INVENTION

An object of the present invention is to provide an improved method of controlling the power supplied to a laser diode (LD) even at an effective data area of a disc.

Another object of the present invention is to provide an apparatus for controlling the power of an LD by this method.

Additional objects and advantages of the invention will be set forth in part in the description which follows and, in part, will be obvious from the description, or may be learned by practice of the invention.

According to an aspect of the present invention, there is provided a method of controlling the power of a laser diode by using a difference between the laser level reflected by a disc and a reference level, the difference being detected after the laser level reflected by the disc is compared with the reference level, the method comprising: (a) generating a periodic synchronization signal; and (b) controlling the power of the laser diode in synchronism with the synchronization signal.

According to another aspect of the present invention, there is provided an apparatus for controlling the power of a laser diode, comprising: a photo diode which receives a laser reflected by a disc to generate a current signal corresponding to the level of the received laser; a comparator which comprises the output from the photo diode with a reference voltage and outputs a binary decision signal which indicates which input for the comparison is higher than the other input; an up/down counter which up/down counts the binary decision signal in accordance with the comparison result of the comparator; a laser diode driver which controls the power level of the laser diode according to the count result of the up/down counter; and a controller which controls the automatic power control of the laser diode (APC controller), interposed between the up/down counter and the laser diode driver, the APC controller latching the output of the up/down counter in synchronism with a periodic synchronization signal, and outputting the latch result to the laser diode driver.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
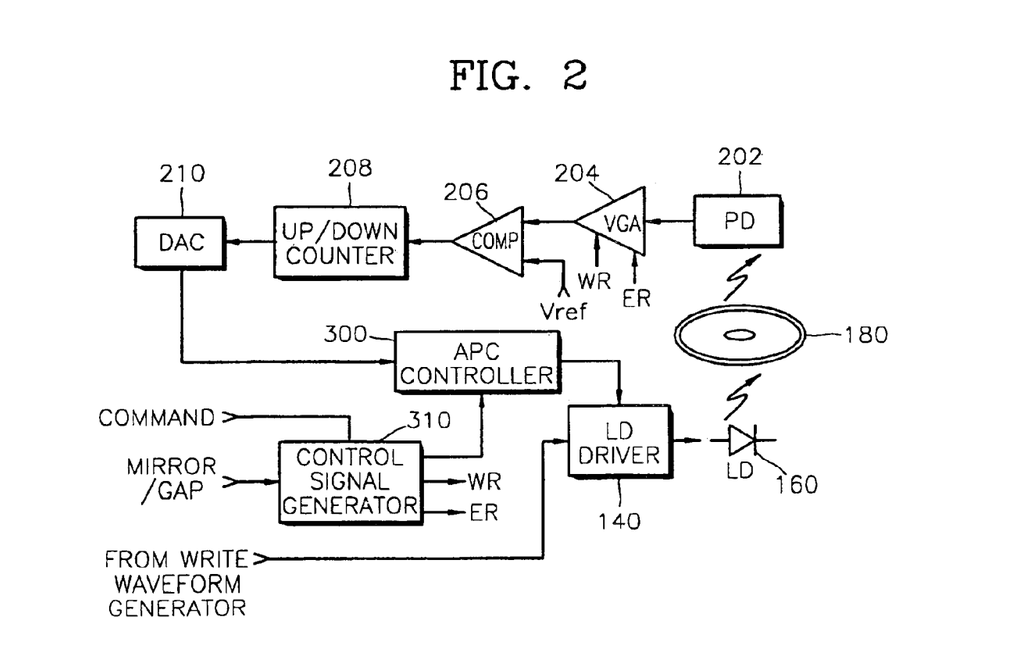
FIG. 2 is a block diagram showing a structure of an apparatus for controlling the power supplied to a laser diode (LD) according to an embodiment of the present invention.

Referring to FIG. 2, which is a block diagram showing the structure of an apparatus for controlling the power supplied to a laser diode (hereinafter, referred to as automatic laser diode power control (APC) circuit), elements that perform the same as those of FIG. 1 are represented by the same reference numerals as those used in FIG. 1, and an explanation thereof will be omitted. Reference numeral 300 represents an APC controller and reference numeral 310 represents a control signal generator.

The APC controller 300 controls the output from the digital-to-analog converter (DAC) 210 according to the selected APC mode. In the present invention, the APC mode includes a sub-APC mode, an average APC mode and a sub-average APC mode. The sub-APC mode refers to a mode where the APC is controlled at a non-data recording area of a disk and the control value is maintained up to the following area of the disc. In a digital versatile disc-random access memory (DVD-RAM), the non-data record area includes, for example, a mirror or gap area.

In the average APC mode, the average of the current control value from the DAC 210 and a previous control value obtained prior to a predetermined time through APC control performed preceding the current APC control is provided to the laser diode (LD) driver 140. Also, in the sub-average APC mode, an average of control values from the non-data recording area of the disc, such as mirror or gap area is obtained, and the average is maintained up to the following area of the disc.

The control signal generator 310, which is controlled by a microcomputer (not shown), controls an operating mode and operating area of the APC controller 300 while a mirror or gap signal MIRROR/GAP is applied.

Figure 3A:
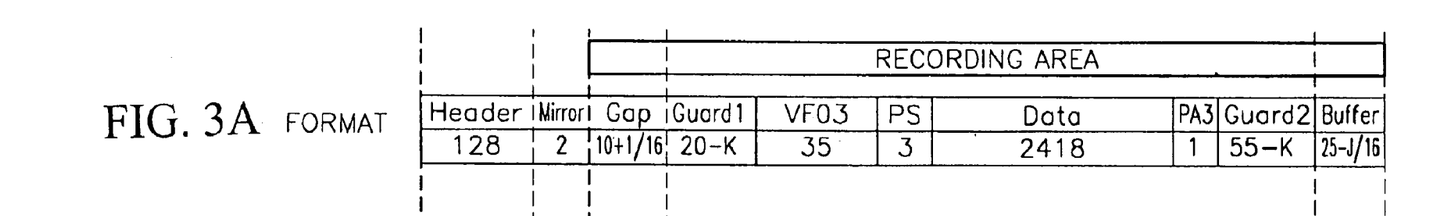
FIGS. 3A through 3D illustrate a relationship between a sector format of a digital versatile disc-random access memory (DVD-RAM) and mirror and gap signals.
Figure 3B:
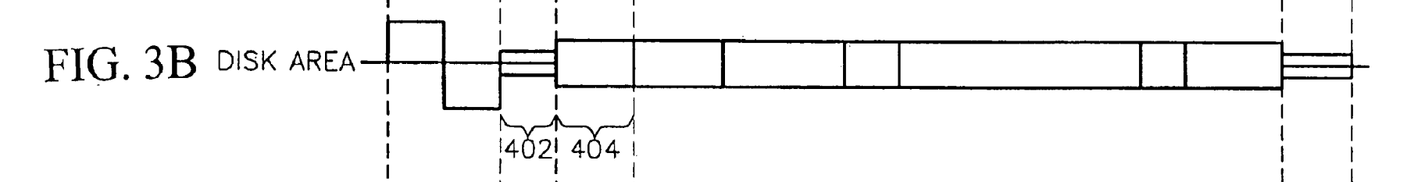
Figure 3C:
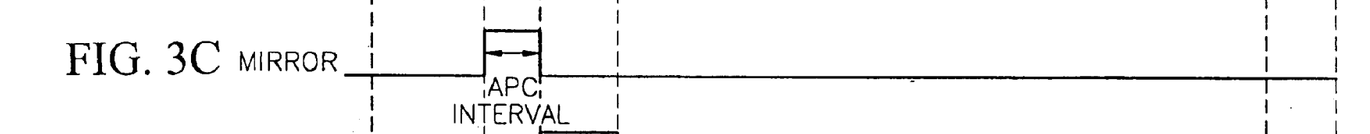
Figure 3D:
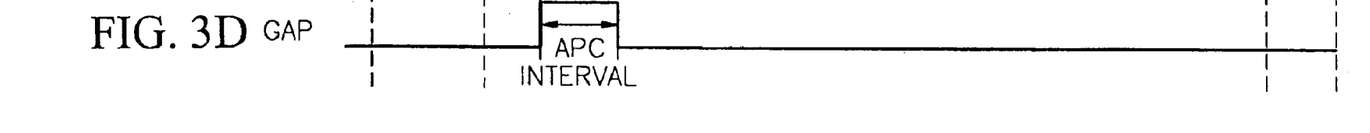

FIGS. 3A through 3D illustrate the relationship between the format of a sector of a DVD-RAM, and mirror and gap signals. As shown in FIGS. 3A through 3B, the sector of the DVD-RAM essentially includes a header area, a mirror area 402 and a data recording area. A header signal for tracking control is recorded in the header area, and no signal is recorded in the mirror area 402 according to specifications. In the data recording area which includes a gap area 404, a sector address, data and the like are recorded. As shown in FIG. 3C, a mirror signal MIRROR indicates the mirror area 402 of the disk and, as shown in FIG. 3D, a gap signal GAP indicates the gap area 404 of the disk.

Figure 4A:
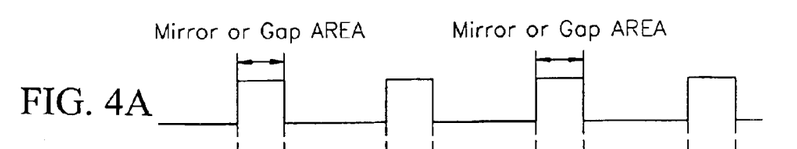
FIGS. 4A through 4E show waveforms illustrating the operation of the apparatus shown in FIG. 2.
Figures 4B, 4C:
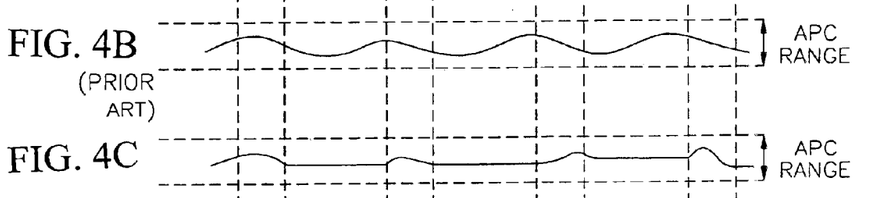
Figure 4D:
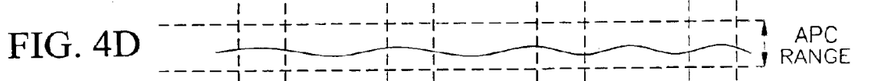
Figure 4E:
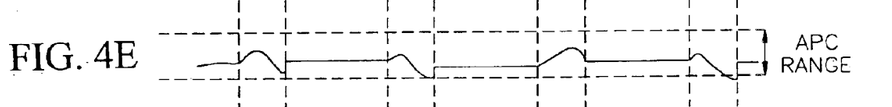

FIGS. 4A through 4E show waveforms illustrating the operation of the APC circuit shown in FIG. 2. FIG. 4A shows a waveform of a mirror or gap signal MIRROR/GAP, FIG. 4B represents laser power fluctuation in the conventional APC circuit shown in FIG. 1, in which APC is performed over the entire area of the disc. Also, FIG. 4C through 4E illustrate laser power fluctuation in the sub-APC mode, the average APC mode and the sub-average APC mode, respectively, in the APC circuit shown in FIG. 2.

As shown in the waveform of FIG. 4C, in the sub-APC mode, a control value, which is latched at the end of the mirror or gap area, is maintained up to the following mirror or gap area. Also, in the average APC mode, shown in the waveform of FIG. 4D, the average of control values is used, so that the laser power does not sharply change within an APC range. In the sub-average APC mode shown in the waveform of FIG. 4E, the average of control values in the mirror or gap area is maintained up to the next mirror or gap area.

In the sub-APC mode or sub-average APC mode, the APC circuit of FIG. 2 performs APC over a period of one sector because the mirror and gap signals MIRROR/GAP are generated once every sector. Also, since the APC is performed in a non-data recording area such as a mirror area, or in an area that is not used, such as a gap area, continuous fluctuation in laser power does not occur.

In the average APC mode, the APC circuit shown in FIG. 2 shows resilience against external noise, by using the average of the current and preceding control values. That is, the average APC mode provides an effect of low-pass-filtering the control values, so that the APC operation in the average APC mode is resilient against external noise that may contain a radio frequency (RF) component.

Figure 5:
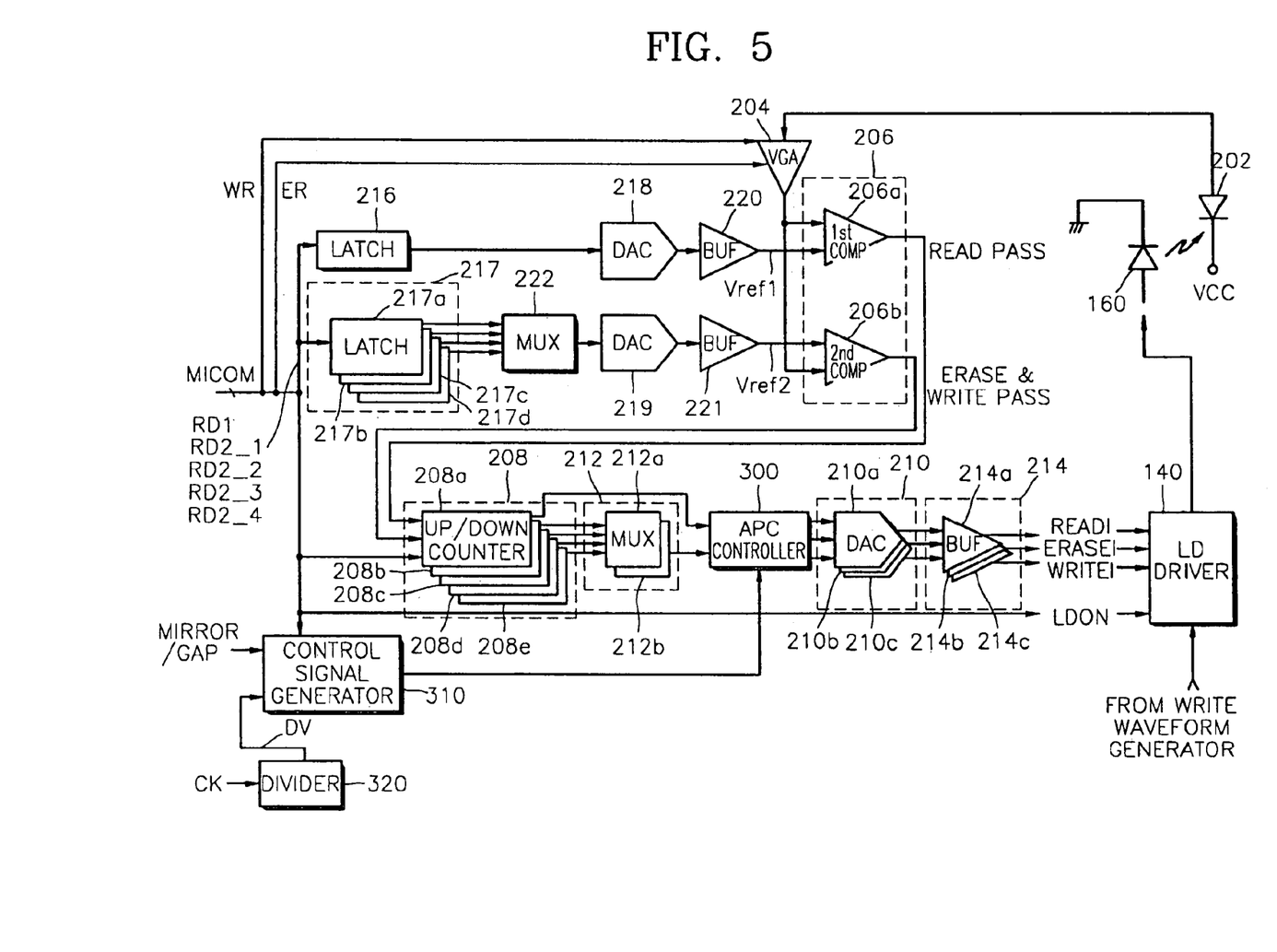
FIG. 5 is a block diagram showing a detailed structure of the apparatus of FIG. 2.

FIG. 5 is a block diagram showing a detailed structure of the APC circuit of FIG. 2. In FIG. 5, elements which perform in the same manner as those of FIG. 1 are represented by the same reference numerals as those used in FIG. 1. The gain of the VGA 204 is varied according to control signals WR and ER, which are applied thereto. The comparator (COMP) 206 includes a first COMP 206a which is used in a playback mode, and a second COMP 206b which is used in erase and record modes. The up/down counter 208 includes five counters 208a through 208e. The first up/down counter 208a is used in a read mode, the second up/down counter 208b is used for lands in the erase mode, the third up/down counter 208c is used for grooves in the erase mode, the fourth up/down counter 208d is used for lands in the erase and record modes, and the fifth up/down counter 208e is used for grooves in the erase and record modes.

The DAC 210 includes three DACs 210a through 210c. The first DAC 210a is used in the read mode, the second DAC 210b is used in the erase mode, and the third DAC 210c is used in the record mode. Also, a MUX 212 including first and second MUXs 212a and 212b couples the second through fifth counters 208b through 208e, to the second and third DACs 210b and 210c, according to whether the current mode is the erase or record mode and whether the current track is a land or groove. The first MUX 212a is used to couple the second and third counters 208b and 208c to the second DAC 210b in the erase mode, and the second MUX 212b is used to couple the fourth and fifth counters 208d and 208e to the third DAC in the record mode.

A BUF 214 including first through third BUFs 214a through 214c buffers the outputs from the first through third DACs 210a through 210c and provides the buffered results to the LD driver 140. In the read mode, the first BUF 214a buffers the output from the first DAC 210a and outputs the result to the LD driver 140, the second BUF 214b buffers the output from the second DAC 210b and outputs the result to the LD driver 140, and the third BUF 214c buffers the output from the third DAC 210c and outputs the result to the LD driver 140.

First and second reference voltages Vref1 and Vref2 are provided to the COMP 206 by the operation of latches 216 and 217, fourth and fifth DACs 218 and 219, fourth and fifth BUFs 220 and 221, and a third MUX 222. The latch 216, which is for use in a read mode, latches a reference data RD1 which is provided from the microcomputer in the read mode, and provides the latched data to the fourth DAC 218. The fourth DAC 218 converts the latched data into analog data, and the fourth BUF 220 outputs the analog data from the fourth DAC 218, as the first reference voltage Vref1 for the read mode, to the first COMP 206a. The latch 217, which is for use in erase and record modes, latches reference data RD2_1, RD2_2, RD2_3 and RD2_4 which are provided from the microcomputer in the erase and record modes. The latch 217 includes first through fourth latches 217a through 217d. The first latch 217a latches the reference data RD2_1 for the erase mode and lands, the second latch 217b latches the reference data RD2_2 for the erase mode and grooves, the third latch 217c latches the reference data RD2_3 for the record mode and lands, and the fourth latch 217d latches the reference data RD2_4 for the record mode and grooves.

The third MUX 222 selectively outputs one of the outputs from the first through fourth latches 217a through 217d according to whether the current mode is the erase or record mode and whether the current track is a land or groove. The fifth DAC 219 converts the data from the third MUX 222 into analog data, and the fifth BUF 221 outputs the analog data from the fifth DAC 219, as the second reference voltage Vref2 for the erase and record modes, to the second COMP 206b. Here, the number of up/down counters, DACs and COMPs may be varied.

The APC controller 300 controls the value to be provided to the DAC 210 in accordance with the APC mode selected by the microcomputer. The control signal generator 310, which is controlled by the microcomputer, controls the operating mode and operating area of the APC controller 300 while the mirror or gap signal MIRROR/GAP is applied. A divider 320 divides a reference clock signal CK of a drive to generate a periodic signal DV. In a disc such as a DVD-RAM, which has no mirror or gap area, the control signal generator 310 controls the operating mode and operating area of the APC controller 300 according to the periodic signal, which is division signal DV, from the divider 320. In such cases, the APC operation is periodically performed. Also, the period of the APC operation can be controlled by varying a division ratio in the divider 320.

Hereinafter, the operation of the APC circuit shown in FIG. 5 will now be described in greater detail according to the APC modes.

1) Sub-APC Mode

The APC circuit of FIG. 5 performs APC operations over a period of one sector in the sub-APC mode, and maintains the control value latched at the current mirror or gap area up to it the following mirror or gap area. The latching at the mirror or gap area can be performed at any point throughout the entire area, and preferably, at the end point of the area.

The sub-APC mode is set by the control of the microcomputer. The control signal generator 310 generates a control signal, under the control of the microcomputer, which controls the APC controller 300 such that it operates in the sub-APC mode. Also, the control signal can control the APC controller 300 such that it operates while the mirror or gap signal MIRROR/GAP, or the division signal DV is applied.

The APC controller 300 latches a signal from the up/down counter 208, or the MUX 212, while it is enabled by the mirror or gap signal MIRROR/GAP, or the division signal DV. In the present embodiment, the APC controller 300 can latch and process 8 samples in the mirror or gap area. The control value latched by the APC controller 300 is applied through the DAC 210 and the BUF 214 to the LD driver 140.

In the sub-APC mode, the APC controller 300 performs latching in a period of the mirror or gap signal MIRROR/GAP or of the division signal DV, so that the latched control value can be maintained until the following mirror or gap signal MIRROR/GAP, or division signal DV is applied. Thus, the power of the LD 160 can be maintained until the following mirror or gap signal MIRROR/GAP or division signal DV is applied.

2) Average APC Mode

In the average APC mode, the APC circuit of FIG. 5 controls the LD driver 140 with the average of control values for a predetermined period. The average APC mode is set by the control of the microcomputer. The control signal generator 310 generates a control signal under the control of the microcomputer, which controls the APC controller 300 such that it operates in the average APC mode.

The APC controller 300 samples control values from the up/down counter 208 or the MUX 212, and calculates the average of a predetermined number of the sampled values. The up/down counters 208a through 208e and the multiplexers 212a and 212b are selected according to the operation mode. Thus, in a certain mode, one of the up/down counters 208a through 208e is selected and one of the multiplexers 212a and 212b is selected (if up/down counter 208a is not selected). The average is applied to the LD driver 140 through the DAC 210 and the BUF 214. In the average APC mode, the APC controller 300 controls the power of the LD 160 with the average of control values output for a predetermined period. The average APC mode provides an effect of low-pass-filtering control values, so that the APC operation in the average APC mode is resilient against external noise, which may contain an RF component.

3) Sub-average APC Mode

In the sub-average APC mode, the APC circuit of FIG. 5 performs APC operation in a period of one sector, and maintains the average of the control values generated during the mirror or gap area up to the following mirror or gap area. The sub-average APC is set by the control of the microcomputer. The control signal generator 310 generates a control signal under the control of the microcomputer, which controls the APC controller 300 such that it operates in the sub-average APC mode.

The APC controller 300 calculates the average of the control values from the up/down counter 208 or the MUX 212, while it is enabled by the mirror or gap signal MIRROR/GAP, or the division signal DV, and latches the calculated average. The up/down counters 208a through 208e and the multiplexers 212a and 212b are selected according to the operation mode. Thus, in a certain mode, one of the up/down counters 208a through 208e is selected and one of the multiplexers 212a and 212b is selected (if up/down counter 208a is not selected). In the present embodiment, 8 samples at the mirror or gap area are latched and processed. The average latched by the APC controller 300 is applied to the LD driver 140 through the DAC 210 and the BUF 214.

In the sub-average APC mode, the APC controller 300 latches the average of the control values in a period of the mirror or gap signal MIRROR/GAP, or of the division signal DV, so that the latched average of control values is maintained until the following mirror or gap signal MIRROR/GAP, or division signal DV is applied. In addition, controlling the power of the LD 160 with the average of control values generated during when the mirror or gap signal MIRROR/GAP, or division signal DV is applied, provides an effect of performing low-pass-filtering, the APC operation in the sub-average APC mode is resilient against external noise which may include an RF component.

4) Read Mode

In the read mode, APC operation is performed by a loop which includes the latch 216, the fourth DAC 218, the fourth buffer 220, the first COMP 206*a*, the first up/down counter 208*a*, the APC controller 300, the first DAC 210*a*, the first BUF 214*a*, the LD driver 140, the LD 160, the PD 202 and the VGA 204. When the microcomputer is initialized, a desired power level for the LD 160 is simultaneously stored in the latch 216 for the read mode. The operation of the LD 160 is started by the power level stored in the latch 216.

The fourth DAC 218 converts the latched data from the latch 216 into analog data, and the fourth BUF 220 outputs the analog data from the fourth DAC 218, as the first reference voltage Vref1 for the read mode, to the first COMP 206*a*. The first up/down counter 208*a* counts the decision signal from the first COMP 206*a*, the first DAC 210*a* converts the count value from the first up/down counter 208*a* into an analog value, and the first BUF 214*a* buffers the output from the first DAC 210*a*, and provides the result to the LD driver 140.

The LD 160 outputs the power under the control of the LD driver 140, and the PD 202 detects the power level. The detected power level is provided as one input of the first COMP 206*a* through VGA 204. If the power level from the LD 160 is higher than the power level which is latched by the latch 216, the decision signal from the first COMP 206*a* is asserted to a logic low, so that the first up/down counter 208*a* down counts the decision signal by one. Accordingly, a lower control value is applied to the LD driver 140, and thus the power level from the LD 160 is decreased. Meanwhile, if the power from the LD 160 is lower than the power level which is latched by the latch 216, the decision signal from the first COMP 206*a* is asserted to a logic high, so that the first up/down counter 208*a* up counts the decision signal by one. Accordingly, a higher control value is applied to the LD driver 140, thereby raising the power level from the LD 160.

The above operation is continued until power level from the LD 160 reaches the power level latched by the latch 216.

5) Erase Mode

In the erase mode, APC operation is performed by a loop which includes the latch 217, the third MUX 222, the fifth DAC 219, the fifth buffer 221, the second COMP 206*b*, the second and third up/down counters 208*b* and 208*c*, the first MUX 212*a*, the APC controller 300, the second DAC 210*b*, the second BUF 214*b*, the LD driver 140, the LD 160, the PD 202 and the VGA 204. When the microcomputer is initialized, a desired power level for the LD 160 is simultaneously stored in the latch 217 for the erase and record modes. The operation of the LD 160 is started by the power level stored in the latch 217.

In the erase mode, the optical output of a disc such as a DVD-RAM must be varied according to the type of tracks (lands or grooves), and thus the first latch 217*a* for lands and the second latch 217*b* for grooves are used. The third MUX 222 selects the output of the first latch 217*a* or the second latch 217*b* according to the type of tracks. In particular, a signal for identifying lands or grooves, which is generated in a tracking servo control circuit, is used.

The fifth DAC 219 converts the data from the third MUX 222 into analog data, and the fifth BUF 221 outputs the analog data from the fifth DAC 219, as the second reference voltage Vref2 for the erase mode, to the second COMP 206*b*. The up/down counter 208 counts the decision signal from the second COMP 206*b*. In particular, the second up/down counter 208*b* for lands and the third up/down counter 208*c* for grooves, are used according to whether the track is a land or groove. The first MUX 212*a* selects the output of the second up/down counter 208*b* or the third down/up counter 208*c*, according to the type of tracks.

The second DAC 210*b* converts the count value from the second or third up/down counter 208*b* or 208*c* into an analog value, and the second BUF 214*b* buffers the analog value from the second DAC 210*b*, and provides the result to the LD driver 140. The LD 160 outputs the power under the control of the LD driver 140, and the PD 202 detects the power level. The detected power level is provided as one input of the second COMP 206*b* through the VGA 204.

6) Record Mode

In the record mode, APC operation is performed by a loop which includes the latch 217, the third MUX 222, the fifth DAC 219, the fifth buffer 221, the second COMP 206*b*, the fourth and fifth up/down counters 208*d* and 208*e*, the second MUX 212*b*, the APC controller 300, the third DAC 210*c*, the third BUF 214*c*, the LD driver 140, the LD 160, the PD 202 and the VGA 204. When the microcomputer is initialized, a desired power level for the LD 160 is simultaneously stored in the latch 217 for the erase and record modes. The operation of the LD 160 is started by the power level stored in the latch 217.

In the record mode, the optical output of a disc such as a DVD-RAM must be varied according to the type of tracks (lands or grooves), and thus the third latch 217*c* for lands and the fourth latch 217*b* for grooves are used. The third MUX 222 selects the output of the third latch 217*c* or the fourth latch 217*b* according to the type of tracks.

The fifth DAC 219 converts the data from the third MUX 222 into analog data, and the fifth BUF 221 outputs the analog data from the fifth DAC 219, as the second reference voltage Vref2 for the record mode, to the second COMP 206*b*. The up/down counter 208 counts the decision signal from the second COMP 206*b*. In particular, the fourth up/down counter 208*d* for lands and the fifth up/down counter 208*e* for grooves, are used according to whether the track is a land or groove. The second MUX 212*b* selects the output of the fourth up/down counter 208*d* or the fifth down/up counter 208*e*, according to the type of tracks.

The third DAC 210*c* converts the count value from the fourth or fifth up/down counter 208*d* or 208*e* into an analog value, and the third BUF 214*c* buffers the analog value from the third DAC 210*c*, and provides the result to the LD driver 140. The LD 160 outputs the power under the control of the LD driver 140, and the PD 202 detects the power level. The detected power level is provided as one input of the second COMP 206*b* through the VGA 204.

In the present embodiment, the APC circuit according to the present invention periodically operates according to the three sub-divided APC modes, that is, according to the sub-APC mode, the average APC mode and the sub-average APC mode. However, the APC circuit can also operate continuously through the entire APC mode, as does the conventional APC circuit shown in FIG. 1.

As described above, the APC circuit according to the present invention periodically controls the power level of the LD, unlike the conventional APC circuit having the continuous operating characteristic, so that the laser power level may remain constant, and resilience to external noise can also be obtained. Also, the APC operation is performed at a non-effective data area, not at the effective data area, so that accurate recording/playback result can be ensured.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of controlling power of a laser diode emitting laser light on a disc by using a difference between a level of the laser reflected by the disc and a reference level, the difference being detected after the laser light level reflected by the disc is compared with the reference level, the method comprising:
   generating a periodic synchronization signal; and
   controlling the power of the laser diode in synchronism with the synchronization signal by:
      sampling the difference between the level of the laser light and the reference level to produce a sampled differences,
      calculating an average of a predetermined number of the sampled differences, after producing the sampled differences, to produce an average compared result, and
      controlling the power level of the laser diode according to the average compared result.

2. The method of claim 1, wherein the disc is a digital versatile disc-read only memory (DVD-ROM), and the synchronization signal is a mirror signal indicating a mirror area of the DVD-ROM.

3. The method of claim 1, wherein the disc is a digital versatile disc-read only memory (DVD-ROM), and the synchronization signal is a gap signal indicating a gap area of the DVD-ROM.

4. The method of claim 1, wherein the disc is a digital versatile disc-random access memory (DVD-RAM), and the synchronization signal is obtained by dividing a clock signal required to drive the DVD-RAM by a ratio.

5. The method of claim 4, further comprising varying the division ratio.

6. The method of claim 1, wherein the synchronization signal is obtained by dividing a clock signal required to drive the disc by a ratio.

7. The method of claim 6, further comprising varying the division ratio.

8. The method of claim 1, wherein the controlling the power further comprises controlling the power of the laser diode only at non-effective data areas of the disc.

9. The method of claim 1, wherein the controlling the power further comprises generating the synchronization signal selectively in accordance with a sub automatic power control (APC) mode, an average APC mode and a sub-average APC mode for the disc.

10. The method of claim 1, further comprising:
    adjusting the reference level based upon a read mode, a record mode and an erase mode for the disc.

11. The method of claim 1, wherein the controlling the power further comprises:
    up/down counting according to the average compared result to determine a counted result;
    latching the counted result in accordance with the synchronization signal, to determine a latched power signal; and
    wherein the controlling the power of the laser diode in accordance with the average compared result further comprises controlling the power of the laser diode in accordance with the latched power signal.

12. The method of claim 11, wherein the synchronization signal is a mirror or gap signal or a clock signal required to drive the disc divided by a ratio into a division signal.

13. The method of claim 11, wherein the latching of the counted result comprises:
    sampling the counted result;
    averaging a predetermined number of the sampled counted results to determine an average value; and
    latching the average value in accordance with the synchronization signal, to determine the latched power signal.

14. The method of claim 13, wherein the synchronization signal is a mirror or gap signal or a clock signal divided by a ratio into a division signal.

15. The method of claim 11, wherein the latching of the counted result comprises:
    sampling the counted result;
    averaging the sampled counted results during enablement of the synchronization signal to determine an average value; and
    latching the average value in accordance with the synchronization signal, to determine the latched power signal.

16. The method of claim 15, wherein the synchronization signal is a mirror or gap signal or a clock signal divided by a ratio into a division signal.

17. A method of controlling power of a laser diode emitting laser light on a disc by using a difference between a level of the laser reflected by the disc and a reference level, the difference being detected after the laser light level reflected by the disc is compared with the reference level, the method comprising:
    generating a periodic synchronization signal;
    controlling the power of the laser diode in synchronism with the synchronization signal; and
    adjusting the reference level based upon a read mode, a record mode and an erase mode for the disc, wherein the adjusting of the reference level comprises:
    adjusting the reference level to a first value if the mode for the disc is the read mode,
    adjusting the reference level to a second value if the mode for the disc is the erase mode for lands of the disc,
    adjusting the reference level to a third value if the mode for the disc is the erase mode for grooves of the disc,
    adjusting the reference level to a fourth value if the mode for the disc is the record mode for the lands of the disc, and
    adjusting the reference level to a fifth value if the mode for the disc is the record mode for the grooves of the disc.

18. A method of controlling power of a laser diode emitting laser light on a disc by using a difference between a level of the laser reflected by the disc and a reference level, the difference being detected after the laser light level reflected by the disc is compared with the reference level, the method comprising:
    generating a periodic synchronization signal; and
    controlling the power of the laser diode in synchronism with the synchronization signal, wherein the controlling the power comprises:

comparing a level of the power of the laser diode to the reference level;

up/down counting according to the compared result to determine a counted result; and latching the counted result in accordance with the synchronization signal, to determine a latched power signal;

wherein:

the controlling comprises controlling the power of the laser diode in accordance with the latched power signal; and the up/down counting comprises up/down counting the counted result to generate a first count in a read mode for the disc, up/down counting the counted result to generate a second count in an erase mode of lands of the disc, up/down counting the counted result to generate a third count in the erase mode for grooves of the disc, up/down counting the counted result to generate a fourth count in a record mode of the lands of the disc, and up/down counting the counted result to generate a fifth count in the record mode for the grooves of the disc, and selectively using the first though fifth counts as the counted value for the latching of the counted result.

19. The method of claim 18, further comprising:

multiplexing the second and third counts to generate a first multiplexed signal;

multiplexing the fourth and fifth counts to generate a second multiplexed signal; and the latching of the counted result comprising selectively latching the first count, the first multiplexed signal and the second multiplexed signal based upon a respective one of the read, erase and record modes of the disc.

20. The method of claim 19, wherein the latching of the counted result comprises latching the counted result in a period of a mirror or gap signal or a clock signal divided by a ratio into a division signal.

21. An apparatus for controlling a power of a laser diode emitting laser light on a disc, the apparatus comprising:

a laser driver which controls the power of the laser diode in accordance with a control signal; and a control circuit which generates the control signal in synchronism with a periodic synchronization signal by:

sampling the difference between the level of the laser light and the refraction level to produce sampled differences, calculating an average of a predetermined number of the sampled differences, after producing the sampled differences, to produce an average compared result, and controlling the power level of the laser diode according to the average compared result.

22. The apparatus of claim 21, wherein the control circuit comprises:

a detector which detects the light reflected from the disc, to generate a detected power level of the laser diode;

power signal circuit which generates a power signal in accordance with the detected power level; and an automatic power controller which latches the power signal in synchronism with the synchronism signal, to generate the control signal.

23. The apparatus of claim 22, wherein the power signal circuit comprises:

a comparator which compares the detected power level of the laser diode with a reference level; and an up/down counter which up/down counts according to the output of the comparator to determine a counted result, wherein the counted result is input as the power signal to the automatic power controller.

24. The apparatus of claim 23, wherein the synchronism signal is a mirror signal, a gap signal or a clock signal required to drive the disc divided by a ratio into a division signal.

25. The apparatus of claim 23, wherein the power signal circuit further comprises:

a reference value generator which adjusts the reference level based upon a read mode, a record mode and an erase mode for the disc.

26. The apparatus of claim 23, wherein the automatic power controller latches the counted result in a period of a mirror or gap signal or a clock signal divided by a ratio into a division signal.

27. The apparatus of claim 23, wherein the automatic power controller samples the counted result, averages a predetermined number of the sampled counted results to determine an average value, and latches the average value in accordance with the synchronization signal, to determine the control signal.

28. The apparatus of claim 27, wherein the synchronization signal is a mirror or gap signal or a clock signal divided by a ratio into a division signal.

29. The apparatus of claim 23, wherein the automatic power controller samples the counted result, averages the sampled counted results during enablement of the synchronization signal to determine an average value, and latches the average value in accordance with the synchronization signal, to determine the control signal.

30. The apparatus of claim 29, wherein the synchronization signal is a mirror or gap signal or a clock signal divided by a ratio into a division signal.

31. An apparatus controlling a power of a laser diode emitting laser light on a disc, the apparatus comprising:

a laser driver which controls the power of the laser diode in accordance with a control signal; and a control circuit which generates the control signal in synchronism with a periodic synchronization signal, the control circuit comprising:

a detector which detects the light reflected from the disc, to generate a detected power level of the laser diode;

a power signal circuit which generates a power signal in accordance with the detected power level, the power signal circuit comprising:

a comparator which compares the detected power level of the laser diode with a reference level; and an up/down counter which up/down counts according to the output of the comparator to determine a counted result, wherein the counted result is input as the power signal to the automatic power controller; and a reference value generator which adjusts the reference level based upon a read mode, a record mode and an erase mode for the disc; and an automatic power controller which latches the power signal in synchronization with the synchronization signal, to generate the control signal;

wherein, the reference value generator comprises:

a first latch which adjusts the reference level to a first value if the mode for the disc is the read mode, a second latch which adjusts the reference level to a second value if the mode for the disc is the erase mode for lands of the disc, a third latch which adjusts the reference level to a third value if the mode for the disc is the erase mode for grooves of the disc, a fourth latch which adjusts the reference level to a fourth value if the mode for the disc is the record mode for lands of the disc, a fifth latch which adjusts the reference level to a fifth value if the mode for the disc is the record mode for the grooves of the disc; and a multiplexer which selectively outputs the second through fifth values according to whether a current mode is the erase or record mode and whether a current track is the land or groove; and the comparator comprises:

a first comparator which compares the first latched value and the detached power level in the read mode, and a second comparator which compares the second latched value and the detached power level in the erase or record mode.

32. The apparatus of claim 31, further comprising:

a microcomputer which supplies a first initial reference value to the first latch for adjusting the reference value, a second initial reference value to the second latch for adjusting the reference value, a third initial reference value to the third latch for adjusting the reference value, a fourth initial reference value to the fourth latch for adjusting the reference value, and a fifth initial reference value to the fifth latch for adjusting the reference value.

33. An apparatus for controlling a power of a laser diode emitting laser light on a disc, the apparatus comprising:

a laser driver which controls the power of the laser diode in accordance with a control signal; and a control circuit which generates the control signal in synchronism with a periodic synchronization signal, the control circuit comprising:

a detector which detects the light reflected from the disc, to generate a detected power level of the laser diode;

a power signal circuit which generates a power signal in accordance with the detected power level, the power signal circuit comprising:

a comparator which compares the detected power level of the laser diode with a reference level; and an up/down counter which up/down counts according to the output of the comparator to determine a counted result, wherein the counted result is input as the power signal to the automatic power controller; and an automatic power controller which latches the power signal in synchronization with the synchronization signal, to generate the control signal;

wherein the up/down counter comprises:

a first up/down counter which up/down counts the counted result to generate a first count in a read mode for the disc, a second up/down counter which up/down counts the counted result to generate a second count in an erase mode of lands of the disc, a third up/down counter which up/down counts the counted result to generate a third count in the erase read mode for grooves of the disc, a fourth up/down counter which up/down counts the counted result to generate a fourth count in a record mode of the lands of the disc, and a fifth up/down counter which up/down counts the counted result to generate a fifth count in the record mode for the grooves of the disc; and the automatic power controller selectively uses the first through fifth counts as the counted value for the latching of the counted result.

34. The apparatus of claim 33, wherein the power signal circuit further comprises:

a first multiplexer which multiplexes the second and third counts to generate a first multiplexed signal; and a second multiplexer which multiplexes the fourth and fifth counts to generate a second multiplexed signal;

wherein the automatic power controller selectively latches the first count, the first multiplexed signal and the second multiplexed signal based upon a respective one of the read, erase and record modes of the disc.

35. The apparatus of claim 34, wherein the synchronization signal is a mirror signal, a gap signal or a clock signal to drive the disc divided by a ratio into a division signal.

36. An apparatus for controlling a power of a laser diode emitting laser light on a disc, the apparatus comprising:

a laser driver which controls the power of the laser diode in accordance with a control signal; and a control circuit which generates the control signal in synchronism with a periodic synchronization signal, wherein the control circuit comprising:

a detector which detects the light reflected from the disc, to generate a detected power level of the laser diode, a power signal circuit which generates a power signal in accordance with the detected power level wherein the power signal circuit comprises:

a comparator which compares the detected power level of the laser diode with a reference level, wherein the comparator comprises:

a first comparator which compares the first latched value and the detached power level in the read mode, and a second comparator which compares the second latched value and the detached power level in the erase or read mode, an up/down counter which up/down counts according to the output of the comparator to determine a counted result, wherein the counted result is input as the power signal to an automatic power controller, the up/down counter comprising:

a first up/down counter which up/down counts according to the output from the first comparator to generate a first count in a read mode for the disc, a second up/down counter which up/down counts according to the output from the second comparator to generate a second count in an erase mode of lands of the disc, a third up/down counter which up/down counts according to the output from the second comparator to generate a third count in the erase read mode for grooves of the disc, a fourth up/down counter which up/down counts according to the output from the second comparator to generate a fourth count in a record mode of the lands of the disc, and a fifth fourth up/down counter which fourth up/down counts according to the output from the second comparator to generate a fifth count in the record mode for the grooves of the disc; and a reference value generator which adjusts the reference level based upon a read mode, a record mode and an erase mode for the disc wherein, wherein the reference value generator comprises:

a first latch which adjusts the reference level to a first value if the mode for the disc is the read mode, a second latch which adjusts the reference level to a second value if the mode for the disc is the erase mode for lands of the disc, a third latch which adjusts the reference level to a third value if the mode for the disc is the erase mode for grooves of the disc, a fourth latch which adjusts the reference level to a fourth value if the mode for the disc is the record mode for lands of the disc, a fifth latch which adjusts the reference level to a fifth value if the mode for the disc is the record mode for the grooves of the disc; and a multiplexer which selectively outputs the second through fifth values according to whether a current mode is the erase or record mode and whether a current track is the land or groove, an automatic power controller which latches the power signal in synchronism with the synchronization signal to generate the control signal, and wherein the synchronization signal is a mirror signal, a gap signal or a clock signal required to drive the disk divided by a ratio into a division signal, and the automatic power controller selectively uses the first through fifth counts as the counted value for the latching of the counted result.

* * * * *

UNITED STATES PATENT AND TRADEMARK OFFICE
CERTIFICATE OF CORRECTION

PATENT NO. : 7,057,990 B1
APPLICATION NO. : 09/515101
DATED : June 6, 2006
INVENTOR(S) : Jin-gyo Seo It is certified that error appears in the above-identified patent and that said Letters Patent is hereby corrected as shown below:

First Page Column 2 Item (56) (Other Publications), Line 1, after "1996," insert --no. 12,--.

First Page Column 2 Item (57) (Abstract), Line 12, change "subdivided" to --sub-divided--.

Column 9, Line 16, after "laser" insert --light--.

Column 9, Line 24, after "produce" delete "a".

Column 10, Line 33, after "laser" insert --light--.

Column 10, Line 57, after "laser" insert --light--.

Column 11, Line 18, after "erase" insert --read--.

Column 11, Line 24, change "though" to --through--.

Column 11, Line 40, after "emitting" delete "laser".

Column 11, Line 46, change "refraction" to --reference--.

Column 11, Line 61, after "the" change "synchronism" to --synchronization--

Column 12, Line 9, change "synchronism" to --synchronization--.

Column 12, Line 41, after "emitting" delete "laser".

Column 12, Line 62, after "in" change "synchronization" to --synchronism--.

Column 13, Line 8, after "for" insert --the--.

Column 13, Line 19, change "detached" to --detected--.

Column 13, Line 21, change "detached" to --detected--.

Column 13, Line 34, after "emitting" delete "laser".

Column 13, Line 52, after "in" change "synchronization" to --synchronism--.

UNITED STATES PATENT AND TRADEMARK OFFICE
CERTIFICATE OF CORRECTION

PATENT NO.         : 7,057,990 B1
APPLICATION NO. : 09/515101
DATED              : June 6, 2006
INVENTOR(S)        : Jin-gyo Seo It is certified that error appears in the above-identified patent and that said Letters Patent is hereby corrected as shown below:

Column 14, Line 21, after "emitting" delete "laser".

Column 14, Line 27 change "comprising:" to --comprises:--.

Column 14, Line 37, change "detached" to --detected--.

Column 14, Line 39, change "detached" to --detected--.

Column 14, Line 39, change "read" to --record--.

Column 15, Line 13, after "for" insert --the--.

Column 15, line 17, change "disc;" to --disc,--.

Column 16, Line 10, change "disk" to --disc--.

Signed and Sealed this

Fifteenth Day of May, 2007

JON W. DUDAS
*Director of the United States Patent and Trademark Office*